United States Patent [19]

McCoy et al.

[11] 4,321,148

[45] Mar. 23, 1982

[54] DEMULSIFICATION OF BITUMEN EMULSIONS

[75] Inventors: David R. McCoy; Robert M. Gipson, both of Austin, Tex.; Kitchener B. Young, Ft. McMurray; Colin L. LaBerge, Alberta, both of Canada

[73] Assignees: Texaco Inc., White Plains, N.Y.; Texaco Canada, Inc., Ontario, Canada

[21] Appl. No.: 152,453

[22] Filed: May 22, 1980

[51] Int. Cl.³ .................. B01D 17/04; C10G 1/00
[52] U.S. Cl. .................. 210/708; 208/11 R; 208/188; 252/341; 252/331
[58] Field of Search .......... 208/11 R, 11 LE, 188; 210/708; 252/328, 329, 331, 340–344, 358

[56] References Cited

U.S. PATENT DOCUMENTS

| | | | |
|---|---|---|---|
| 2,964,478 | 12/1960 | Monson | 252/331 |
| 3,296,117 | 1/1967 | Ross et al. | 252/331 X |
| 3,594,393 | 7/1971 | Buriks et al. | 252/331 X |
| 4,058,453 | 11/1977 | Patel et al. | 208/188 |

FOREIGN PATENT DOCUMENTS 1112908 8/1965 United Kingdom.
1213392 11/1970 United Kingdom.

*Primary Examiner*—Thomas G. Wyse
*Attorney, Agent, or Firm*—Carl G. Ries; Robert A. Kulason; Kenneth R. Priem

[57] ABSTRACT

A process for recovering bitumen from oil-in-water (O/W) emulsions is disclosed wherein water soluble demulsifiers are used. These demulsifiers are hydrophilic polyurethanes wherein the ethylene oxide content of the polyol portion of the polyurethane is greater than about 70% by weight. To resolve the bituminous petroleum emulsions, the process is carried out between 25° and 120° C. wherein the demulsifier of the invention is contacted with the bituminous emulsion.

9 Claims, No Drawings

DEMULSIFICATION OF BITUMEN EMULSIONS

BACKGROUND OF THE INVENTION

1. Field of the Invention

This invention is concerned with the breaking or resolution of oil-in-water (O/W) bituminous emulsions by treatment with hydrophilic polyurethanes.

2. Description of the Prior Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semi solid. These bitumeninous hydrocarbons are usually characterized by being very viscous or even non flowable under reservoir conditions by the application of driving fluid pressure.

Where surface mining is not feasible, the bitumen must be recovered by rendering the tar material mobile in situ and producing it through a well penetrating the tar sand deposit. These in situ methods of recovery include thermal, both steam and in situ combustion and solvent techniques. Where steam or hot water methods are used, a problem results which aggravates the recovery of the bitumen. The difficulty encountered is emulsions produced by the in situ operations. These emulsions are highly stable O/W emulsions which are made even more stable by the usual presence of clays. Most liquid petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions. The uniqueness of these O/W bitumen emulsions is described in C. W. W. Gewers, *J. Canad. Petrol. Tech.*, 7(2), 89–90 (1968). (Prior art Reference A.) There is much prior art concerning the resolution of normal W/O emulsions. Some of the art even mistakenly equates bitumen O/W emulsions with these W/O emulsions. The following is a list of several art references.

B. British Pat. No. 1,213,392 discloses a polyurethane for breaking W/O emulsions.

C. British Pat. No. 1,112,908 discloses the compounds of the present invention, i.e. the hydrophilic polyurethanes. However, the British Patent is concerned only with W/O emulsions. Even in a discussion of prior art, this British Patent discusses hydrophilic polyurethanes and indicates that they are ineffective for breaking emulsions. This patent fails to teach one the specific criticality of using a hydrophilic polyurethane to break bitumen O/W emulsions as taught by the present specification.

D. U.S. Pat. No. 3,786,081 discloses the diol materials used in the present invention but is concerned only with breaking W/O emulsions.

E. U.S. Pat. No. 3,594,393 is also concerned with breaking W/O emulsions with polyurethanes.

F. U.S. Pat. No. 3,640,894 discloses polyurethanes and polyurethanes used in combination with Novolak alkoxylates to break W/O emulsions.

It is an object of the present invention to provide a method whereby O/W bitumen emulsions may be broken by treatment with a class of hydrophilic polyurethanes. Unlike the prior art, the present invention concerns a particular class of polyurethanes and recognizes the unique properties of bitumen O/W emulsions overlooked by the prior art.

SUMMARY OF THE INVENTION

The invention is a method for recovering petroleum from O/W bitumen emulsions by resolving or breaking these emulsions by contacting the emulsions at a temperature of between 25° and 120° C. with a hydrophilic polyurethane of about 2 to 3 functionally containing ethyleneoxy and optionally, propyleneoxy and other alkyleneoxy linkages wherein the ethyleneoxy content of the polyether portion is greater than 70% by weight.

The specific chemicals useful in this process are polyurethanes of greater than 10,000 molecular weight prepared by reaction under appropriate conditions of temperature and catalysis of the following two components: (a) a polyisocyanate, especially diisocyanate such as toluene diisocyanate (TDI) or 4,4′diphenylmethane diisocyanate (MDI), of molecular weight under 500 and (b) a diol or triol containing 70–100% by weight ethyleneoxy units. Either of the two components may be present in excess in the reaction mixture so that the polyurethanes may have terminal hydroxy or isocyanate functionalities.

DESCRIPTION OF THE PREFERRED EMBODIMENTS

The process of this invention utilizing the chemical demulsifier as described above provides improvement over prior art techniques. The present process utilizes as a chemical demulsifier a hydrophilic polyurethane.

Especially useful and preferred in this process are the mixed polyurethanes prepared by reaction under appropriate conditions of temperature and catalysis of the following three components: (a) a polyisocyanate, especially diisocyanate such as TDI or MDI of molecular weight under 500, (b) a diol containing greater than about 80 weight percent ethyleneoxy units, especially poly(oxyethylene) glycols of about 1000 or greater molecular weight and (c) a hydrophobic diol of about 500 or less molecular weight in the case of $HO(RO)_nH$ diols (R=propylene or butylene moieties) or containing about 8 or less carbon atoms in the case of HO-R′-OH diols where R′=alkylene groups (linear, branched or cyclic) or unsaturated hydrocarbon moieties containing double or triple bonded species. Functionality greater than 2 may be used for any of the three reactive components as long as mole ratios are adjusted so as to obtain a final product that is water soluble. Also, this preferred chemical demulsifier should have a minimum average molecular weight of 8,000 and a minimum weight percent ethyleneoxy content in the diols charged (total weight of b and c components) of 80%.

The produced bitumen emulsions may be treated by the process of our invention in a conventional manner, for example, in a conventional horizontal treater operated, for example, from about 25° to 120° C. and, preferably, from about 50° to 90° C. at atmospheric or slightly higher pressures. The concentration of the chemical demulsifier described above used in treating the bitumen in water emulsions may range from about 1 to 200 parts per million and, preferably, from about 10 to 100 parts per million with the optional addition of an organic diluent and/or inorganic salt as well as standard fluoculants and mechanical or electrical means of demulsification. The following examples describe more fully the present process. However, these examples are given for illustration and are not intended to limit the invention.

The examples which follow describe the preparation of various chemical demulsifier candidates and the demulsification test results.

The following basic testing procedure was employed in the testing of the various demulsifier candidates.

(a) A 1% solution of each chemical was prepared (in $H_2O$ or in toluene).

(b) 100 ml of fresh, hot bitumen emulsion of known bitumen content obtained by in situ steam flooding in tar sand pattern located at Ft. McMurray, Alberta, Canada was poured into a sample bottle.

(c) 50 parts (volume) of Wizard Lake crude was added as diluent to 100 parts bitumen contained in the emulsion.

(d) Chemical was added to the diluted emulsion at the following concentrations: 10, 20, 30, 50, 75 and 100 ppm.

(e) Contents of the bottles were mixed and placed in an oven at 180°–200° F. for a 24 hour period.

(f) BS & W determinations were made on the oil layer and for some systems the oil content in the water layer was estimated by the following method:

(i) A series of color standards were prepared by dissolving 750, 500, 250, 200, 150, 100, 75, 50 and 25 ppm by weight of bitumen directly in 1,1,1-trichloroethane.

(ii) 5 ml of the water layer in a sample bottle was transferred to a separatory funnel.

(iii) The water aliquot was extracted with 25 ml of 1,1,1-trichloroethane and the extract filtered to remove solids.

(iv) The extracted solvent was compared as to color with the prepared standards in identically sized vials (Dilution of the extract with more solvent was used if necessary). From this comparison the original oil content of the water was estimated. With each emulsion, a blank was also run in which no chemical agent was introduced. Similar results were obtained from all these blanks; namely, the sample consisted of a thin upper layer consisting mainly of diluent (sometimes containing substantial water), a broad middle layer consisting of unbroken emulsion, and a small (sometimes non-existent) dark water layer containing particles or chunks of solid bitumen and clay.

EXAMPLE I

Preparation of Polyurethane from PEG-1450

A one-liter resin flask was charged with 200 grams of a 1450 molecular weight poly(oxyethylene)glycol. The contents were stripped for one half hour at 100° C. at 1 mm Hg pressure and cooled under nitrogen. The following materials were charged to the flask: 300 grams toluene (previously dried over 3A molecular sieves), 0.2 g 2,6-di-t-butyl-p-cresol, and 0.08 g dibutyl tin dilaurate. 18.5 ml toluenediisocyanate (TDI) were added over a 4 minute period at 50° C. with mechanical stirring. The reaction mixture was stirred under nitrogen atmosphere for one half hour at 50° and 2 hours at 100° C. Solvent was removed and the product found by gel permeation chromatography and hydroxyl number determination to have a molecular weight of about 10,000.

EXAMPLE II

Higher Molecular Weight Polyurethane from PEG-1450

The method of Example I was repeated using (a) 19.5 ml TDI and (b) 100 ml additional toluene during the digestion step to reduce viscosity. The product was found to have an average molecular weight of 25,000 basis the hydroxyl number.

EXAMPLE III

Preparation of Polyurethane from Mixed Alkylene Oxide Diol

The method of Example I was used with 2.6 ml TDI, replacing the PEG-1450 with 200 grams of a mixed poly(oxyalkylene)glycol of 10,000 molecular weight and containing 75 wt. % oxyethylene and 25 wt. % oxypropylene functionalities. The product was shown by hydroxyl number analysis to have an approximate average molecular weight of 21,500.

EXAMPLE IV

Preparation of Polyurethane from Hydrophilic Triol

The method of Example I was used with 4 ml TDI and 200 g of a 5000 molecular weight triol obtained by the base-catalyzed addition of a 70:30 (w:w) ethylene oxide:propylene oxide mixture to glycerol. The product was shown by hydroxyl number to have a molecular weight of approximately 20,100.

EXAMPLE V

Preparation of Polyurethane from Alternating Block Diol

The method of Example I was used with 13.5 ml TDI and 200 g of a 2000 molecular weight diol of the type $PO_k[(EO)_l(PO)_m(EO)_n]_2$* containing 50 weight percent ethylene oxide and prepared by sequential addition of ethylene oxide, propylene oxide and ethylene oxide to a poly(oxypropylene) glycol using base catalysis. The reaction product had a molecular weight of 19,900.
*where k, l, m and n are positive integers.

EXAMPLE VI

Preparation of Polyurethane from PEG-7500

The procedure of Example I was repeated in a 2-liter resin flask with 400 g 7500 molecular weight poly(oxyethylene) glycol, 600 g toluene and 6 ml TDI. The product had an average molecular weight of 23,600.

EXAMPLE VII

Preparation of Polyurethane from Hydrophobic Block Diol

The procedure of Example I was repeated using 8.2 ml TDI and 200 g of the 26-molar ethoxylate of 2150 molecular weight poly(1,2-butyleneoxy)glycol. The product had an average molecular weight of 11,650.

EXAMPLE VIII

Preparation of Polyurethane from Hydrophilic Block Diol

The procedure of Example I was repeated using 18.5 ml TDI and 200 grams of the 24-molar ethoxylate of 400 molecular weight poly(1,2-butyleneoxy)glycol. The product had a molecular weight of 11,250.

EXAMPLE IX

Preparation of a Polyurethane from a PEG-1450 and Excess TDI

The procedure of Example I was repeated using 20.9 ml TDI (1.13 moles/mole diol). The product had a molecular weight of about 86,000 (weight average) by gel permeation chromatography.

EXAMPLE X

Preparation of a Polyurethane from a Hydrophilic Triol

To three pounds of the triol described in Example IV was added 10 pounds of a 90:10 (w:w) mixture of ethylene oxide:propylene oxide at 100°-120° under pressure in the presence of 5.4 g KOH catalyst. (To 5 pounds of this product were added an additional 9.7 pounds mixed oxide portion at 100°-130° C. This final triol had an hydroxyl number of 8.9.) The intermediate molecular weight triol from the first 90:10 oxide addition had an hydroxyl number of 11.7 (14,400 molecular weight) and contained 85 weight percent ethyleneoxy units. 200 grams of the 11.7 hydroxyl number triol was treated with 1.4 ml TDI using the procedure of Example I to obtain a polyurethane of greater than 30,000 molecular weight.

EXAMPLE XI

Demulsifier Testing of Various Chemicals

Specific test results are summarized in the table on the following page for the chemicals prepared above. Example XIb represents the first successful reduction to practice of this invention. In several cases, comparisons are made with POLYOX ®WSR-301, a known demulsifier*. Relative increases in performance are seen with increase in hydrophilicity (compare XIh and XIi) and molecular weight (compare XIa and XIb). Example XIf is an unsuccessful example of a demulsifier with inadequate ethyleneoxy content. Successful examples are given for polyurethanes from diols and from triols, use of molar excess of either polyol or polyisocyanate and use of polyols including PEG's, mixed random polyols and mixed block polyols.

*U.S. Pat. No. 4,058,453

TABLE I

| | | | Demulsifier Testing | | |
|---|---|---|---|---|---|
| | | | | Treated Emulsion | |
| Example XI | Candidate Demulsifier | % Bitumen in Emulsion | % BS & W in Oil (ppm chemical used) | Middle Phase | Water Phase |
| a | Product of Example I | 6 | — | Emulsion broke but poor coalescence | — |
| b | Product of Example II | 12–16 | 9(30), 7(50) | very small sharp interface | — |
| c | Product of Example III | 12–16 | 4(10), 3(30) | thin | some oil present |
| d | Product of Example IV | 24 | 3(20), 4(100) | thin at high chemical concentration | muddy |
| e | POLYOX ®WSR-301* | 24 | 4(20) | thin | cloudy to translucent |
| f | Product of Example V | 19 | 21(100) | wide | dark, muddy |
| g | Product of Example VI | 17 | 2.5(100) | thin | medium brown, muddy |
| h | Product of Example VII | 17 | 20(20) | wide | muddy |
| i | Product of Example VIII | 17 | 3(100) | wide | light, muddy |
| j | POLYOX WSR-301* | 17 | 2.5(20, 30, 50) | little or no | light muddy to translucent |
| k | Product of Example IX | 22 | 6(20, 50, 100) | very little | translucent; ppm oil = 1500 (30 ppm chemical), 750(100) |
| l | POLYOX WSR-301* | 22 | 9(20), 8(30), 4.5(50) | very little | translucent; ppm oil = 750(30), 1250(50) |
| m | Product of Example X | 24 | 3(20), 6(50), 2.5(100) | little to none | muddy; 2500 ppm oil (75) |
| n | POLYOX WSR-301* | 24 | 6(20), 3.5(30), 13(50) | narrow | cloudy to clear; 1250 ppm oil (50) |

*A commericial 4,000,000 molecular weight poly(ethylene oxide).

EXAMPLE XII

Preparation of Mixed Polyurethane from PEG-7500 and PBG-400

A one-liter resin flask was charged with 190 g 7500 molecular weight poly(oxyethylene) glycol and 10 g 400 molecular weight polyol(1,2-butyleneoxy) glcyol. The stirred mixture was dried by heating at about 1 mm Hg pressure and 100° C. for one half hour. After cooling the mixture to 80° C., 300 g toluene (previously dried over 3A molecular sieves), 0.08 g dibutyl tin dilaurate and 0.2 g 2,6-di-t-butyl-p-cresol were added. To this mixture at 50° C. were added 5.7 ml toluenediisocyanate in 4.3 ml toluene over a five minute period. This mixture was digested for one hour at 50° C. while adding 200 ml dry toluene to reduce viscosity, followed by digestion at 100° C. for two hours (nitrogen padding used during digestion periods). Toluene was stripped off in vacuum leaving a white solid product with a molecular weight basis hydroxyl number of 14,600.

EXAMPLE XIII

Preparation of Mixed Polyurethane from PEG-7500 and PBG-4000

The procedure of Example XII was repeated using 158 g PEG-7500 and 42 g PBG-4000 with 3.6 ml TDI to obtain a polyurethane having a molecular weight of 9,600, basis hydroxyl number.

EXAMPLE XIV

Preparation of Mixed Polyurethane from PEG-7500 and 1,4-Butylene Glycol

The procedure of Example XII was repeated using 195 g PEG-7500 and 5 g 1,4-butylene glycol (added after the vacuum stripping step) and 9.3 ml TDI to obtain a polyurethane having a molecular weight of 13,000 basis hydroxyl number.

EXAMPLE XV

Preparation of Mixed Polyurethane from PEG-7500 and Polymeg 1000

The procedure of Example XII was repeated using 176 g PEG-7500 and 24 g Polymeg 1000 (1000 molecular weight poly(1,4-butyleneoxy) glycol) with 6 ml TDI to obtain polyurethane having a molecular weight of 52,000 basis hydroxyl number.

EXAMPLE XVI

Stepwise Preparation of Mixed Polyurethane from PEG-7500 and PBG-400

200 g PEG-7500 was charged to a 1-liter resin flask and stirred at 100° C. for one half hour at about 1 mm Hg pressure. 500 g dry toluene were added and the solution cooled to 30° C. under nitrogen atmosphere. 7.6 ml TDI were added and the stirred mixture digested for one hour at 30°-32° C. The following materials were added: 0.08 g dibutyl tin dilaurate, 0.2 g 2,6-di-t-butyl-p-cresol and 12.7 g PBG-400. The mixture was heated to 100° C. over a 1¼ hour period while adding 100 g toluene to reduce viscosity. The mixture was then stirred under nitrogen atmosphere at 100° C. for an additional 1½ hours. Removal of solvent in vacuum left a white solid having a molecular weight of 17,500 basis hydroxyl number.

EXAMPLE XVII

Preparation of Mixed Polyurethane from PEG-7500 and Neopentyl Glycol

The procedure of Example XII was used in a 1-liter flask with 195 g PEG-7500, 5.4 g neopentyl glycol (added after vacuum stripping step) and 10.6 ml TDI. The product had a molecular weight of 10,300.

EXAMPLE XVIII

Preparation of Mixed Polyurethane from PEG-7500 and 1,4-Butynediol

The procedure of Example XII was used with 195 g PEG-7500, 4.8 g 1,4-butynediol (added after vacuum stripping step) and 11 ml TDI to obtain a product having a molecular weight of 9,700.

EXAMPLE XIV

Demulsifier Testing of Various Chemicals from Examples XII through XVIII

In several of the examples comparisons are made with POLYOX WSR-301, a known demulsifier. The negative Examples 19c and 19f demonstrate the effect of too little ethyleneoxy content in the final polyurethane.

TABLE II

Demulsifier Testing

| Example XIX | Candidate Demulsifier | % Bitumen in Emulsion | % BS & W in Oil (ppm chemical used) | Middle Phase | Water Phase |
|---|---|---|---|---|---|
| a | Product of Example 12 | 18 | 1(20, 100) | moderately large | muddy, light brown |
| b | POLYOX WSR-301* | 18 | 1.5(20), 1(30, 50) | moderately large | muddy, light brown |
| c | Product of Example 13 | 18 | layer mainly diluent | wide | muddy, contains bitumen chunks |
| d | Product of Example 14 | 27 | 3.5(50) | small | translucent with clay particles; 750 ppm oil at 50 ppm chemical |
| e | POLYOX WSR-301* | 27 | 2(50) | narrow to none | cloudy to clear 800 ppm oil (50) |
| f | Product of Example 15 | 22 | layer mainly diluent | wide | dark, muddy; contains bitumen chunks |
| g | Product of Example 16 | 22 | 6(20), 5(50) | little to none | cloudy to clear; 1250 ppm oil (50) |
| h | POLYOX WSR-301* | 22 | 9(20), 4.5(50) | little | translucent; 1250 ppm oil (50) |
| i | Product of Example 17 | 22 | 6(20), 10(50) | small | translucent, cloudy; 1250 ppm oil (30), 1000(50) |
| j | Product of Example 18 | 22 | 4.5(20), 5(100) | very small to none | translucent, cloudy; 1000 ppm oil(30), 750(75) |
| k | POLYOX WSR-301* | 22 | 3(20), 3(50) | moderate to small | clear to cloudy; 750 ppm oil (30), 1250(50) |

We claim:

1. A process for recovering petroleum from oil-in-water bitumen emulsions by demulsifying said emulsions by adding thereto demulsifiers comprising hydrophilic polyurethanes of greater than about 10,000 molecular weight prepared by reaction under appropriate conditions of temperature and catalysis of a polyisocyanate and a diol or triol containing at least 70% by weight ethyleneoxy units.

2. A process as in claim 1 wherein the polyisocyanate is toluene diisocyanate.

3. A process as in claim 1 where the hydrophilic polyurethane contains exclusively alkoxy units of the ethyleneoxy type.

4. A process as in claim 1 wherein the polyurethane comprises a polyisocyanate and a diol.

5. A process as in claim 4 wherein the polyisocyanate is toluene diisocyanate.

6. A process for recovering petroleum from oil-in-water bitumen emulsions by demulsifying said emulsions by adding thereto demulsifiers comprising hydrophilic polyurethanes of greater than 8,000 molecular weight prepared by reaction under appropriate conditions of temperature and catalysis of a polyisocyanate, a diol containing greater than about 80 weight percent ethyleneoxy units and a hydrophobic diol of about 500 or less molecular weight wherein the minimum weight percent ethyleneoxy content of the combined diols is 80 weight percent.

7. A process as in claim 6 wherein the polyisocyanate is toluene diisocyanate.

8. A process as in claim 6 wherein the diol containing greater than about 80 weight percent ethyleneoxy units is poly(oxyethylene) glycol of about 1000 or greater molecular weight.

9. A process as in claim 6 wherein the hydrophobic diol is 1,4-butylene glycol.

* * * * *